May 15, 1923. 1,455,436
G. H. FIFIELD
ART OF FILTRATION
Filed Nov. 5, 1920 2 Sheets-Sheet 1
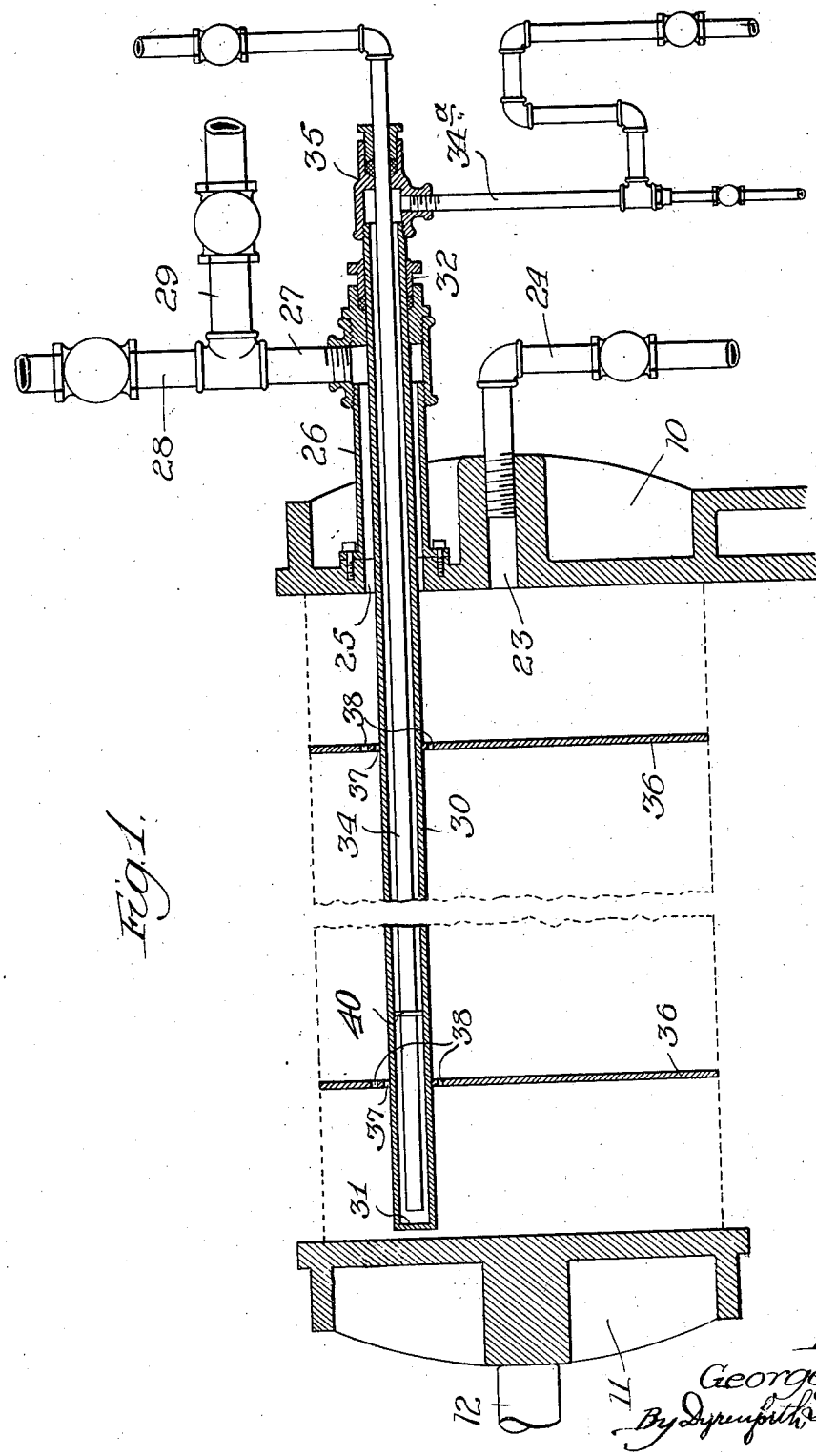

May 15, 1923.　　　G. H. FIFIELD　　　1,455,436
ART OF FILTRATION
Filed Nov. 5, 1920　　　2 Sheets-Sheet 2
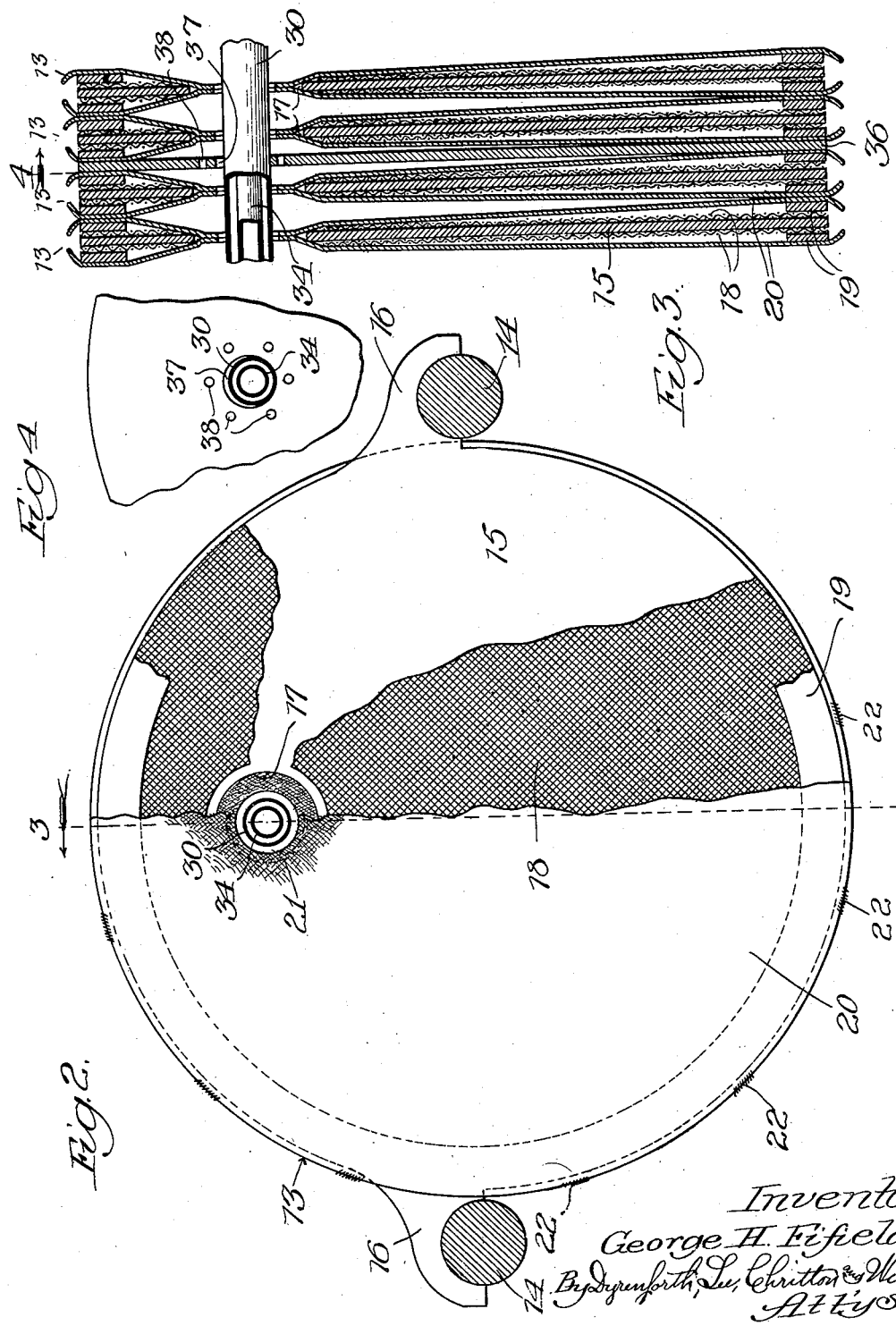

Patented May 15, 1923.

1,455,436

UNITED STATES PATENT OFFICE.

GEORGE H. FIFIELD, OF CULVER, INDIANA, ASSIGNOR TO STANDARD OIL COMPANY, OF WHITING, INDIANA, A CORPORATION OF INDIANA.

ART OF FILTRATION.

Application filed November 5, 1920. Serial No. 421,859.

*To all whom it may concern:*

Be it known that I, GEORGE H. FIFIELD, a citizen of the United States, residing at Culver, in the county of Marshall and State of Indiana, have invented a new and useful Improvement in the Art of Filtration, of which the following is a specification.

The present invention relates to the art of filtration and more particularly to the filtration of paraffin wax or other wax or fusible substance from chilled oil or other vehicle. It will be fully understood from the following description, illustrated by the accompanying drawings, in which—

Fig. 1 is a broken longitudinal sectional view of a filter press, details of the filter members or plates being omitted;

Fig. 2 is an elevation of a filter member, partly broken away to show its construction;

Fig. 3 is a detail longitudinal sectional view through a portion of the filter press; and Fig. 4 is a detail view in elevation of a portion of an intermediate supporting plate.

Referring more particularly to the drawings, the numeral 10 indicates the stationary head of a filter press, which may be mounted upon a suitable support, and the numeral 11 the movable head, which may be forced in the direction of the stationary head 10 by means of the plunger 12, actuated by hydraulic or other suitable means. The arrangement of these parts may be that customary in filter presses, and is not herein described in detail.

Between the heads of the press the filter members 13 are slidably mounted upon rails 14, 14. The construction of these filter members, which are circular in form, is clearly shown in Figs. 2 and 3. In each filter member there is a central disk 15, provided at substantially diametrically opposite points with outwardly extending arms 16, 16 adapted to ride upon rails 14, 14. Plate 15 is likewise provided with an opening 17 located above its center and preferably more than half the radius of the plate above that point. On each side of plate 15 is mounted a disk 18 of woven wire or similar perforate material, these disks being of substantially the same area as the plate 15, and being provided with openings aligning with that in plate 15. Rings 19 securely fastened on each side of the filter members at its circumference serve to hold its parts together and likewise formed thickened rims for the filter member itself. A filter cloth or blanket 20 is applied on each side of the filter member, the filter cloths being provided with openings aligning with, but somewhat smaller than the openings 17 of plates 15. The filter cloths 20, 20 on both sides of each filter member or disk 13 are sewed tightly together around their openings within the opening 17 in each plate 15, as shown at 21, and loosely or at intervals around the circumference of the plate, as at 22, 22. A plurality of filter members of the character described are mounted between the heads of the press, and in normal operation are held tightly together by the pressure applied to movable head 11.

The stationary head 10 is provided centrally with an opening 23, into which the chilled oil to be filtered is fed through pipe 24. Above this central opening 23 is an opening 25, aligned with the openings through the filter elements of the press. A cylindrical chamber 26 is secured to the head 10 and opens into opening 25 and through it into the press. A feed pipe 27 communicates with chamber 26 and this pipe has, in the form shown in the drawings, two valved branches 28 and 29.

The aligned openings in the filter elements 13 form a substantially cylindrical opening extending the length of the press. A pipe 30, smaller than this opening, extends through the cylindrical chamber 26 and through the opening through the press for substantially the entire length of the latter. The pipe 30 is closed at its end 31 within the press. A suitable stuffing box 32 seals the pipe 30 into the end of the chamber 26. At the end of the pipe 30 outside the filter press a drain pipe 34ª communicates laterally therewith.

A smaller pipe 34 extends through stuffing box 35 into pipe 30, and reaches almost to the end of the latter pipe. Pipe 34 is open at its end.

If found necessary or advisable for the support of pipe 30, plates 36 may be inserted at intervals between filter elements in the press. These plates are circular in form, being supported upon the rods 14 in the same manner as plates 15. Circular openings 37 are provided in plates 36 at a height designed to hold the pipe 30, which rests in said openings, at its proper level. Smaller openings 38 are provided surrounding openings 37 to permit free passage of liquid through the plates.

In operation, the press being considered to have been previously chilled, chilled oil containing paraffin wax is forced into the press under pressure through pipe 24, the entire press being held under pressure by plunger 12. The oil spreads through the press, filling the spaces between the filter members, which spaces are generally called the wax spaces, and filters through the filter cloths. The filtered oil drains from the press through the spaces provided by the insertion of the wire mesh screens 18 between the rings 19 and plates 15 of the filter members. The wax deposits upon the filter cloths 20 and gradually fills the wax spaces. When the latter are substantially filled the introduction of chilled oil is stopped.

In order to effect the removal of the wax, steam is introduced through pipe 34 into pipe 30, the heated pipe melting the wax surrounding it and enlarging the open passage for liquid through the press. Water at a suitable temperature (above 180° F. and preferably about 200° F.) is then introduced into this passage through pipe 27 and chamber 26. The hot water rapidly melts the wax in the press, the relatively high position of the liquid passage through the press causing all the wax above the passage as well as that below it to be melted. The melted wax drains through the filter cloths and out of the press, being separately collected for further treatment after separation of water from the melted wax by settling.

In many cases the introduction of steam for the purpose of melting the wax to enlarge the liquid passage may be entirely dispensed with, the hot water being directly introduced into the press and traveling through the passage left by the oil in the wax.

After the wax has been removed from the press the latter is chilled by the passage of cold pressed oil or of chilled wax-bearing oil. In the latter case the drips taken from the press before it is thoroughly chilled must be again chilled and pressed.

Although the invention has been described in connection with certain specific details of operation and construction, it is not intended that these details shall be regarded as limitations upon the scope of the invention, except in so far as included in the accompanying claims.

I claim:

1. In wax filtering apparatus, in combination, a filter surface, means for forcing chilled oil through said surface, thereby depositing wax therefrom, and a heat conductor extending transversely through said filter surface whereby heat may be applied to the wax deposited thereupon.

2. In wax filtering apparatus, in combination, a filter surface, a confined chamber on each side thereof, means for supplying chilled oil into one of said chambers, means for withdrawing filtered oil through the other of said chambers, and means for applying a heating fluid to the first of said chambers.

3. In wax filtering apparatus, in combination, a plurality of aligned spaced filtering surfaces provided with aligned openings, means for forcing chilled oil into the alternate spaces between said surfaces, means for withdrawing filtered oil from the others of said spaces, and a heating pipe extending through the openings in said filter surfaces.

4. In wax filtering apparatus, a plurality of aligned filter disks, with openings therethrough, each disk comprising spaced filter surfaces, means for removing oil from the spaces within the filter disks between the filter surfaces, wax depositing spaces between the filter disks, and a heating pipe extending through the openings in the filter disks.

5. In wax filtering apparatus, in combination, a plurality of aligned filter disks with openings therethrough, each disk comprising spaced filter surfaces, means for removing oil from the spaces in each disk between the filter surfaces, wax depositing spaces between the filter disks, a heating pipe extending through the openings in the filter disks, and means for introducing a heating fluid into the spaces between the disks.

6. In wax filtering apparatus, a plurality of spaced filter surfaces in horizontal alignment, said surfaces being provided above their central points with aligned openings, means for forcing oil into alternate spaces between said surfaces and means for withdrawing liquid from the remaining spaces, and means for forcing heating liquid through the aligned openings.

7. In wax filtering apparatus, a plurality of spaced filter surfaces in horizontal alignment, said surfaces being provided above their central points with aligned openings, means for forcing oil into alternate spaces between said surfaces and means for withdrawing liquid from the remaining spaces, a heating pipe extending through the openings in the filter surfaces and means for forcing heating liquid through the openings outside of the heating pipe.

8. In wax filtering apparatus, a plurality of aligned filter disks, having aligned openings at least half the radius of the disks above their centers, each disk comprising spaced filter surfaces, means for removing liquid from the spaces within the filter disks between the filter surfaces, wax spaces between the filter disks, and means for forcing heated liquid through the aligned openings.

9. In wax filtering apparatus, a plurality of aligned filter disks, having aligned openings at least half the radius of the disks above their centers, each disk comprising spaced filter surfaces, means for removing liquid from the spaces within the filter disks between the filter surfaces, wax spaces between the filter disks, a heating pipe extending through the openings in the filter surfaces and means for forcing heating liquid through the openings outside of the heating pipe.

10. The improvement in the art of filtering wax from chilled oil which comprises the passing of oil simultaneously through a plurality of adjacently arranged filter surfaces, thereby depositing a cake of wax upon each of said filter surfaces, the heating of each of said cakes of wax at adjacent points in said cakes to melt each of said cakes to form communication therethrough, and the introducing of a heated fluid through said communication.

11. The improvement in the art of filtering wax from chilled oil which comprises the passing of oil simultaneously through a plurality of adjacently arranged filter surfaces, thereby depositing a cake of wax upon each of said filter surfaces, the applying of heat to each of said cakes of wax at adjacent points to melt the same to form communication therethrough, the introducing of a hot liquid through said communication to melt the entire cakes, and the passing of the hot liquid and melted wax through the filter surfaces.

12. The improvement in the art of filtering wax from chilled oil which comprises the passing of chilled oil through a filter surface, thereby depositing a cake of wax upon said surface, the applying of heat to said cake of wax at one point in order to melt away a part of the same, and the introducing of a hot fluid into the space formed by the wax thus melted away, to come in contact with the rest of the cake of wax to melt the same.

13. The improvement in the art of filtration which consists in passing chilled wax bearing oil simultaneously through a plurality of adjacent vertical filter surfaces, thereby depositing cakes of wax between said surfaces, and applying a heated liquid to said wax cakes at points above their centers to melt the wax and effect its removal from the filter surfaces.

14. The method of removing wax from a filter press which consists in forcing a heated liquid through the wax filled press through a passage above the center of the press.

15. The improvement in the art of filtering wax from chilled oil which comprises the passing of oil simultaneously through a plurality of adjacently arranged filter surfaces, thereby depositing a cake of wax upon each of said filter surfaces, the melting of parts of said cakes to form a communication therethrough, and the introducing of a heated fluid through said communication.

16. The improvement in the art of filtering wax from chilled oil which comprises the passing of oil simultaneously through a plurality of adjacently arranged filter surfaces, thereby depositing a cake of wax upon each of said filter surfaces, the locally melting of aligned parts of said cakes to form a communication therethrough, and the introducing of a heated fluid through said communication, 17. The improvement in the art of filtering wax from chilled oil which comprises the passing of oil simultaneously through a plurality of adjacently arranged filter surfaces, thereby depositing a cake of wax upon each of said filter surfaces, the forming of openings through said cakes to provide a communication therethrough, and the introducing of a heated fluid through said communication.

18. The improvement in the art of filtering wax from chilled oil which comprises the passing of oil simultaneously through a plurality of filter surfaces, thereby depositing a cake of wax upon each of said filter surfaces, and the applying of a hot liquid directly to said cakes of wax to melt the same.

19. The improvement in the art of filtering wax from chilled oil which comprises the passing of oil simultaneously through a plurality of filter surfaces, thereby depositing a cake of wax upon each of said filter surfaces, and the applying of hot water directly to said cakes of wax to melt the same.

20. The improvement in the art of filtering wax from chilled oil which comprises the passing of oil simultaneously through a plurality of filter surfaces, thereby depositing a cake of wax upon each of said filter surfaces, the applying of a hot fluid directly to said cakes of wax to melt the same, and the removing of the melted wax and hot fluid through the filter surfaces.

21. The improvement in the art of filtering wax from chilled oil which comprises the passing of oil simultaneously through a plurality of filter surfaces, thereby depositing a cake of wax upon each of said filter surfaces, the applying of hot water directly to said cakes of wax to melt the same, and the removing of the melted wax and hot water through the filter surfaces.

22. The improvement in the art of filtering wax from chilled oil which comprises the passing of oil simultaneously through a filter surface, thereby depositing a cake of wax upon said filter surface, and the applying of a hot liquid directly to said cakes of wax to melt the same.

23. The improvement in the art of filtering wax from chilled oil which comprises the passing of oil simultaneously through a filter surface, thereby depositing a cake of wax upon said filter surface, and the applying of hot water directly to said cakes of wax to melt the same.

24. The improvement in the art of filtering wax from chilled oil which comprises the passing of oil simultaneously through a filter surface, thereby depositing a cake of filter surface, the applying of a hot fluid directly to said cakes of wax to melt the same, and the removing of the melted wax and hot fluid through the filter surface.

25. The improvement in the art of filtering wax from chilled oil which comprises the passing of oil simultaneously through a filter surface, thereby depositing a cake of wax upon said filter surface, the applying of hot water directly to said cakes of wax to melt the same, and the removing of the melted wax and hot water through the filter surface.

GEORGE H. FIFIELD.